(12) United States Patent
DeVos

(10) Patent No.: US 7,489,782 B1
(45) Date of Patent: Feb. 10, 2009

(54) REGISTRY RESTORE TO ORIGINAL HARDWARE

(75) Inventor: Steve R. DeVos, Kirkland, WA (US)

(73) Assignee: Symantec Operating Corporation, Mountain View, CA (US)

( * ) Notice: Subject to any disclaimer, the term of this patent is extended or adjusted under 35 U.S.C. 154(b) by 1049 days.

(21) Appl. No.: 10/789,901

(22) Filed: Feb. 27, 2004

(51) Int. Cl.
*H04L 9/00* (2006.01)
*G06F 12/00* (2006.01)
*G06F 13/00* (2006.01)
*G06F 13/28* (2006.01)
*G06F 17/30* (2006.01)
*G01R 31/28* (2006.01)

(52) U.S. Cl. .................. 380/278; 711/161; 711/162; 707/203; 707/204; 714/15

(58) Field of Classification Search ............... 707/203, 707/204; 711/161, 162; 714/13, 15; 380/278
See application file for complete search history.

(56) References Cited

U.S. PATENT DOCUMENTS

| | | | |
|---|---|---|---|
| 6,535,998 B1 * | 3/2003 | Cabrera et al. ............. | 714/15 |
| 6,820,214 B1 * | 11/2004 | Cabrera et al. ............. | 714/15 |
| 7,334,157 B1 * | 2/2008 | Graf et al. ................. | 714/13 |
| 2005/0125460 A1 * | 6/2005 | Yu et al. ................... | 707/203 |

OTHER PUBLICATIONS http://www.melbpc.org.au/pcupdate/2003/2003article8.htm Reprinted from the Mar. 2000 issue of PC Update, the magazine of Melbourne PC User Group, Australia.*
Microsoft® Windows® XP Registry Guide (Excerpt) by Jerry Honeycutt Pub Date: Sep. 11, 2003.*
"Supporting Windows NT and 2000 Workstations & Server", James Mohr, Prentice Hall Professional Technical Reference, Dec. 1999, 1 page.
"Registry Reference for Windows Server 2003," Microsoft Corporation 2004, 1 page.
"Description of the Microsoft Windows Registry," Microsoft Knowledge Base Article—256986, Microsoft, Dec. 5, 2003, 6 pages.

* cited by examiner

*Primary Examiner*—Kambiz Zand
*Assistant Examiner*—Benjamin A Kaplan
(74) *Attorney, Agent, or Firm*—Lawrence J. Merkel; Meyertons, Hood, Kivlin, Kowert & Goetzel, P.C.

(57) ABSTRACT

In one embodiment, a computer accessible medium comprises a plurality of instructions that may be executed during a restore operation of a database to a computer system. A first instance of the database is included in backup data being restored and a second instance of the database exists on the computer system. When executed, the instructions process one or more first keys of the second instance that identify one or more second keys of the second instance. The identified second keys are to be preserved in the database subsequent to the restore operation. If the computer system's hardware is equivalent to hardware of a source of the backup data, the instructions, when executed, process a third key that overrides a preservation of at least one of the second keys. In another embodiment, the third key takes precedence over the first keys if a conflict exists between the first keys and the third key.

22 Claims, 6 Drawing Sheets

REGISTRY RESTORE TO ORIGINAL HARDWARE

BACKGROUND OF THE INVENTION

1. Field of the Invention

This invention is related to the field of backup and restore of computer systems.

2. Description of the Related Art

Various software tools exist for backing up computer systems and restoring backup data to computer systems (referred to as "backup software"). Such backup software is provided to permit recovery, at least to the most recent backup state, from a failure. The failure may be due to user error, hardware failure in the backed-up computer system, other disaster situations originating outside the computer system that cause data loss such as by damaging the computer system, or a combination of the above. User error may include activities such as accidental file deletion, file corruption, or erroneous file content change.

Some operating systems maintain a database describing the computer system configuration. For example, recent versions of the Windows™ operating system from Microsoft Corp. (Redmond, Wash.) include the Registry. The Registry is a centralized, hierarchical database storing computer system configuration information. The hierarchy is specified as a set of "keys" that identify information in the database. Entries associated with the keys contain the information. The Registry is stored in one or more files on the computer system. Thus, the Registry is generally backed-up along with other computer system data during a backup operation.

Typically, when a restore operation is to be performed to a computer system, either the operating system is already installed on the computer system prior to initiating the restore operation or the operating system is installed as part of the overall restore operation (referred to as an automated system restore operation). In an automated system restore operation, the operating system is installed first from an installation media before attempting to restore the backup data. In either case, there is an instance of the Registry maintained by the operating system on the computer system and an instance of the Registry in the backup data. Merely overwriting the instance on the computer system with the instance in the backup data does not lead to correct results.

For example, the instance of the Registry on the computer system may have information pertinent to the restore operation. In some cases, if a file is open on the computer system and a backed-up copy of the file is being restored in the restore operation, a copy of the file is made on the computer system with a different file name or in a different directory and the Registry is updated to cause the backed-up file to be restored with its original file name/location on the next reboot. Particularly, one or more keys in the Registry may identify the files to be restored on the next reboot. In other cases, it is desirable to retain certain keys of the Registry instance on the computer system if there are differences between that Registry instance and the instance in the backup data. For example, if the computer system to which the restore is being performed is not the same computer system from which the backup was made, some keys of the Registry instance on the computer system may be different from corresponding keys of the Registry instance in the backup data due to differences in the new computer system versus the original computer system.

Originally, backup software "hard-coded" the Registry keys that were not to be restored from the backup instance (instead using the keys from the instance on the computer system). Unfortunately, as the operating system evolved, the list of which Registry keys were not to be restored changed. Thus, in many cases, an update of the operating system also required an update to the backup software to change the hard-coded list of Registry keys.

Subsequently, two keys were added to the Registry to identify the keys not to restore. The two keys are referred to as "KeysNotToRestore" and "AsrKeysNotToRestore". The AsrKeysNotToRestore is used if an automated system restore operation is being performed, and takes precedence over the KeysNotToRestore in such restore operations for any conflicting definitions between the two keys. The backup software reads the KeysNotToRestore and optionally the AsrKeysNotToRestore. These two keys may be used to merge the identified keys from the Registry instance on the computer system with the other keys from the Registry instance in the backup data. The merged Registry instance is then restored to the computer system.

Unfortunately, in some cases, the above restoration mechanism loses certain hardware-specific information that may result in the user feeling that a correct restore has not occurred. Such situations occur when the restore operation is performed to a computer system that includes the same hardware as the computer system from which the backup was made. Particularly, certain hardware-specific keys are not captured using the above mechanisms. These hardware-specific keys may cause incorrect operation if restored to a system that does not include the same hardware. Accordingly, the KeysNotToRestore/AsrKeysNotToRestore mechanism relies on Plug 'n Play to generate the hardware-specific keys with appropriate settings for the computer system to which the restore is performed, and does not restore these keys from the backed-up Registry.

An example in which hardware-specific keys are lost in the KeysNotToRestore/AsrKeysNotToRestore mechanism occurs in a laptop computer system that has two network interface cards (NICs). Laptop computer systems often have one wireless NIC for use when the laptop is away from its docking station and another NIC for communicating through the docking station on a wired network. The wireless NIC may use dynamic host configuration protocol (DHCP) to obtain TCP/IP settings, but the other NIC may have fixed TCP/IP settings (e.g. a fixed IP address) bound to the NIC in the Registry. If the restore operation is to a computer system that includes the same hardware, it is desirable to capture the TCP/IP settings and restore them.

In another example, certain keys may bind a specific device driver to a hardware device. The operating system may also have a driver that can be used for the hardware device, but the user may prefer a different driver (e.g. a manufacturer-supplied driver that has more features). When the operating system is installed on the computer system for performing the restore operation, the operating system's driver is associated with the hardware device. If the restore is being performed to different hardware, using the operating system driver is typically the best course of action. However, if the restore is being performed to the same hardware, the driver indicated in the Registry instance in the backup data may be desired. Other examples of hardware-specific settings that are often lost include display settings (which sometimes are bound to the particular display hardware in the Registry) or other programmable hardware settings that are bound to a hardware device in the Registry.

SUMMARY OF THE INVENTION

In one embodiment, a computer accessible medium comprises a plurality of instructions. The plurality of instructions may be executed during a restore operation of a database to a computer system, wherein the database describes a computer system configuration. A first instance of the database is included in backup data being restored and a second instance of the database exists on the computer system. The instructions, when executed, process one or more first keys of the second instance. The first keys identify one or more second keys of the second instance. Identification of a second key by the first keys indicates that the second key is to be preserved in the database subsequent to the restore operation. If the computer system's hardware is equivalent to hardware of a source of the backup data, the instructions, when executed, process a third key. The third key overrides a preservation of at least one of the second keys. A computer system including a processor and the computer accessible medium and a method are also contemplated.

In another embodiment, a computer accessible medium comprises a plurality of instructions. The plurality of instructions may be executed during a restore operation of a database to a computer system, wherein the database describes a computer system configuration. A first instance of the database is included in backup data being restored and a second instance of the database exists on the computer system. The instructions, when executed, process one or more first keys of the second instance, wherein the one of a second key by the first keys indicates that the second keys is to be preserved in the database subsequent to the restore. If the computer system's hardware is equivalent to hardware of a source of the backup data, the plurality of instructions process a third key, wherein the third key takes precedence over the one or more first keys if a conflict exists between the one or more first keys and the third key. A computer system including a processor and the computer accessible medium and a method are also contemplated.

BRIEF DESCRIPTION OF THE DRAWINGS

The following detailed description makes reference to the accompanying drawings, which are now briefly described.

Figure 1:
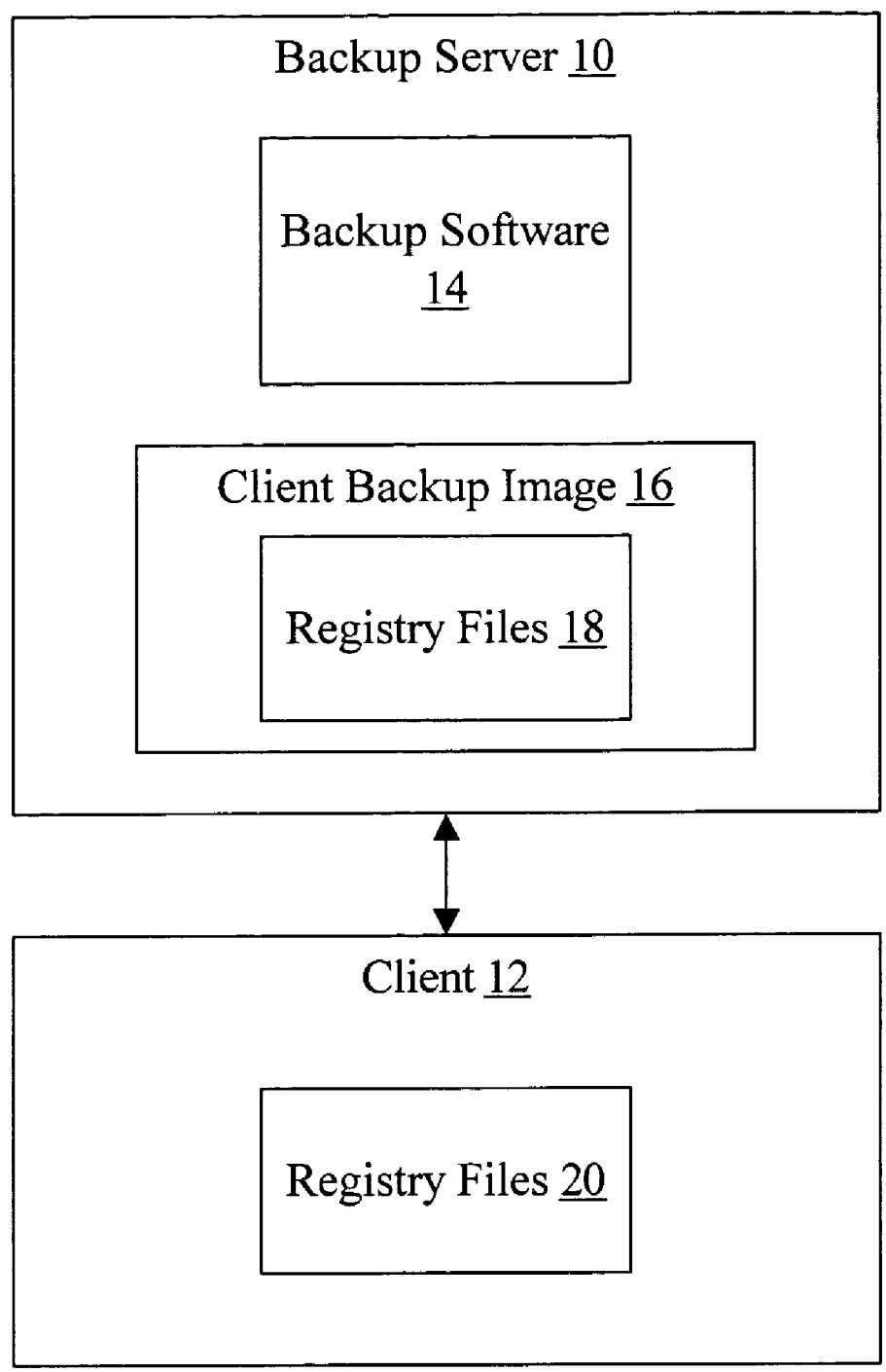
FIG. 1 is a block diagram of one embodiment of a backup server and a client.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In some embodiments below, an example that includes the Windows operating system and the Registry for describing the computer system configuration is used. Other embodiments may use other operating systems, and such embodiments may use any database that describes the computer system configuration. Generally, the computer system configuration may include one or more of hardware settings, hardware identification, software identification, software settings, and/or links between software (such as device drivers) and hardware.

Turning now to FIG. 1, a block diagram of one embodiment including a backup server computer system 10 and a client computer system 12 is shown. The backup server computer system 10 may be more briefly referred to as the backup server 10. Similarly, the client computer system 12 may more briefly be referred to as the client 12. The backup server 10 may be coupled to the client 12. For example, the backup server 10 may be coupled to the client 12 through any sort of network, such as a local area network (LAN), metropolitan area network (MAN), wide area network (WAN), wireless network, the Internet, an intranet, an extranet, or any combination of the above.

The backup server 10 may include backup software 14 and a client backup image 16. The backup software 14 may comprise any software configured to perform backup and restore of computer system data from one or more client computer systems such as the client 12. For example, in some embodiments, the backup software 14 may be similar to the VERITAS NetBackup™ and/or VERITAS Bare Metal Restore™ available from VERITAS Software Corporation (Mountain View, Calif.). In other embodiments, the backup software 14 may be similar to backup products from any other vendor.

The client backup image 16 may comprise the backup data for the client 12. Among other files from the client 12, the client backup image 16 may include one or more Registry files 18 comprising the Registry at the time the client 12 was backed up. The Registry files 18 may comprise one instance of the Registry, referred to as the "backup instance" herein. The client 12 may also include one or more Registry files 20. The Registry files 20 may comprise the current state of the Registry on the client 12. The Registry files 20 are thus a second instance of the Registry, referred to herein as the "current instance". As used herein, an "instance" of a database (e.g. an instance of the Registry) may refer to a complete copy of the database. Two instances of a database may have differing contents. For example, the backup instance and the current instance may have differing contents.

The Registry includes the KeysNotToRestore and AsrKeysNotToRestore, as described previously. Additionally, the Registry includes a newly defined key, referred to herein as "HardwareKeys". The HardwareKeys may take precedence over KeysNotToRestore and AsrKeysNotToRestore, when used. The backup software 14 may use the HardwareKeys for restore operations that are performed to a client computer system having equivalent hardware to the client computer system from which the backup was made. If a restore operation is performed to a client computer system that does not have equivalent hardware, the backup software 14 may not use the HardwareKeys, and the restore operation may be controlled by the KeysNotToRestore and the AsrKeysNotToRestore.

Hardware may be "equivalent" in the above sense if it is the same hardware (either in the same computer system or transferred to a new computer system) or if the hardware has the same operation as the original hardware in the client computer system from which the backup was made. For example, hardware may have the same operation as the original hardware if it is the same manufacturer and model as the original hardware. Hardware may also have the same operation as the original hardware if it operates according to the same programming model as the original hardware, even if it is a different manufacturer or model. Thus, in general, an original client may be a source of a backup image (including the backup instance of the Registry). A restore operation may be performed to the original client, to a different client having equivalent hardware, or to a different client having different hardware. In the case of the restore operation to the original client or the different client having equivalent hardware, the HardwareKeys may be used in some embodiments.

In one embodiment, a user may specify that equivalent hardware is included in the client to which the restore operation is being performed as part of initiating the restore operation in the backup software 14. In other embodiments, the backup software 14 may determine that equivalent hardware is included (e.g. comparing information identifying the hardware in the backup instance and the current instance of the Registry).

The HardwareKeys may be used to override the KeysNotToRestore and AsrKeysNotToRestore, to restore keys specified in those two keys when restoring to equivalent hardware. For example, a restore operation to a laptop computer system that has two network interface cards (NICs) may specify, with HardwareKeys, that the key or keys specifying the fixed TCP/IP settings (e.g. the fixed IP address) for the NIC used for docking be restored from the backup instance. Similarly, the HardwareKeys may specify that keys binding a specific device driver to a hardware device are restored from the backup instance. The HardwareKeys may specify that keys defining display settings that are bound to the display hardware in the Registry be restored or that other programmable hardware settings that are bound to a hardware device in the Registry be restored.

In some embodiments, the HardwareKeys may include entries that conflict with entries in the KeysNotToRestore and/or the AsrKeysNotToRestore. The conflicting entries in the HardwareKeys may not include the keys that are to be restored if the restore operation is performed to equivalent hardware. In some cases, the conflicting entries of HardwareKeys may specify no keys, effectively deleting all the keys from the conflicting entry of KeysNotToRestore and/or AsrKeysNotToRestore (thereby causing the keys to be restored from the backup instance). In other cases, some of the keys in the conflicting entry are to be restored from the backup instance and other keys in the conflicting entry may be preserved from the current instance. The keys to be preserved may be specified in the conflicting entry of the HardwareKeys.

In other embodiments, the HardwareKeys may directly specify that keys that are to be restored from the backup instance. The keys specified by HardwareKeys may be compared to the keys specified by KeysNotToRestore and AsrKeysNotToRestore, and if a match is found, the key may be restored from the backup instance (e.g. the matching key may be deleted from the list of keys not to be restored).

The processing of the HardwareKeys during a restore operation may not be performed if the restore operation is not to equivalent hardware. Thus, erroneous operation of the computer system due to restoring hardware-specific keys from the backup instance may be avoided when non-equivalent hardware is being used.

The backup software 14 may also be configured to populate the HardwareKeys in the Registry of the client 12 prior to backing up the client 12. For example, the backup software 14 may populate the Registry during installation (or during installation of the client-side software, in embodiments that include client-side software). Alternatively, the backup software 14 may populate the Registry in response to the client 12 being added to the list of clients that are backed up by the backup server 10.

Figure 7:
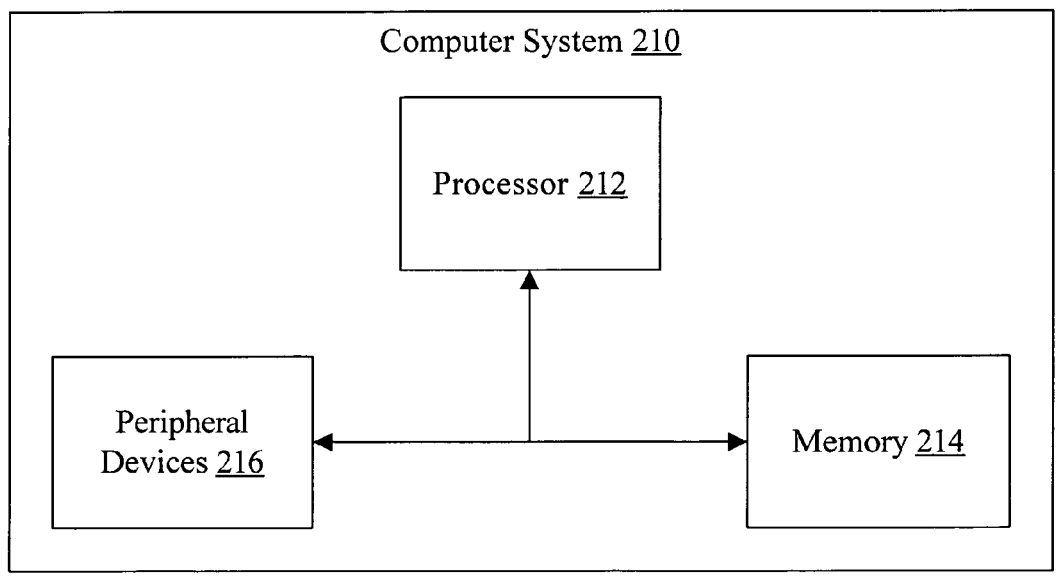
FIG. 7 is a block diagram of one embodiment of a computer system.

Each of the backup server 10 and the client 12 may comprise computer systems. A computer system may generally comprise at least one processor configured to execute instructions (e.g. the instructions comprising the backup software 14), memory to store the instructions, a computer accessible medium to store the instructions, various peripheral devices, etc. An exemplary computer system is shown in FIG. 7.

While FIG. 1 illustrates one client 12 that is backed-up by the backup server 10, in general any number of clients may be backed up by the backup server 10. A client backup image 16 may be stored by the backup server 10 for each client 12. It is noted that, while backup software 14 is shown on the backup server 10, client-side software may also be included on each client 12. The client-side software and the backup software 14 may cooperate to provide backup/restore operations.

Figure 2:
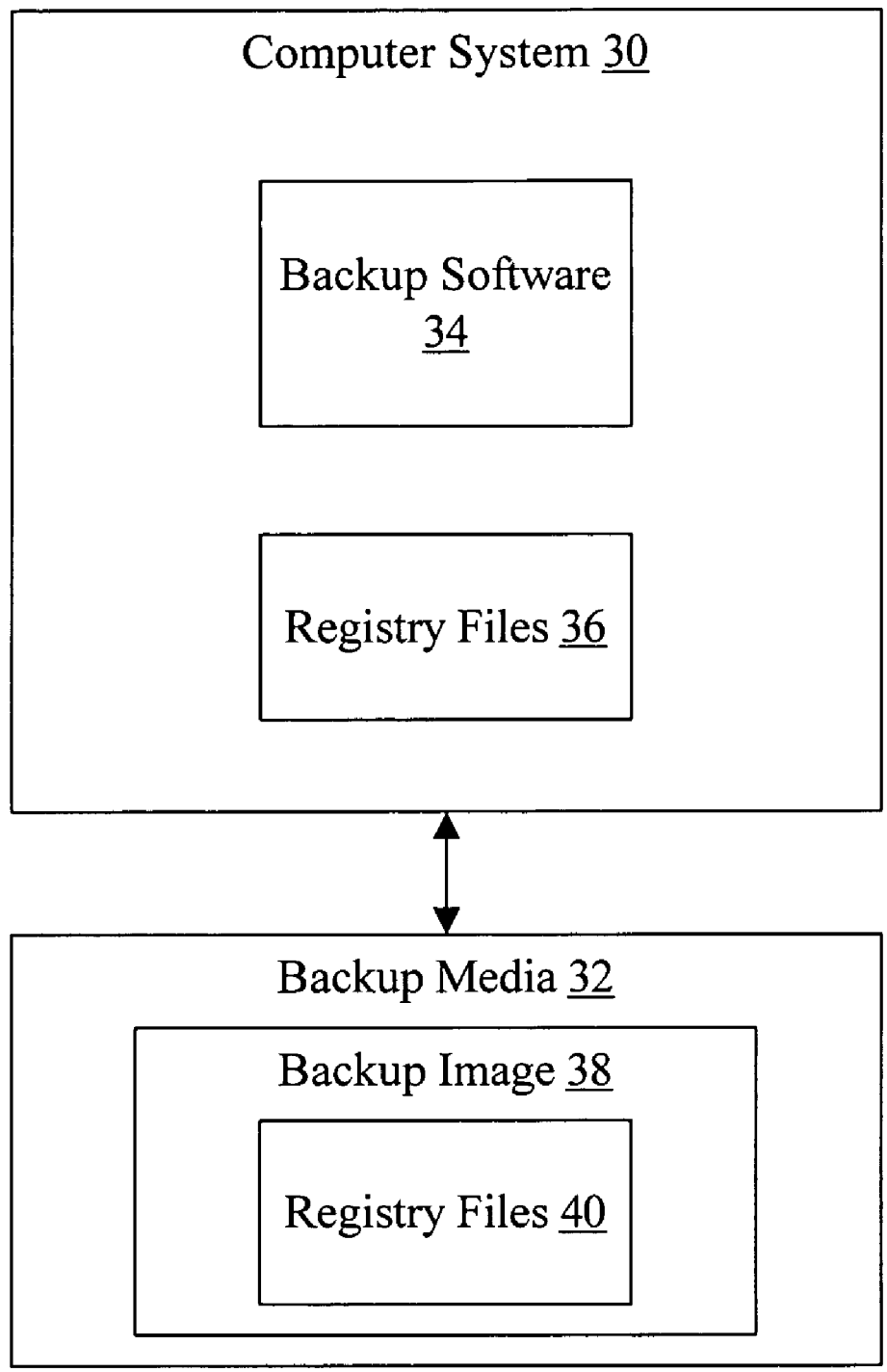
FIG. 2 is a block diagram of a computer system and a backup media.

Turning now to FIG. 2, a block diagram of one embodiment of a computer system 30 and a backup media 32 is shown. The computer system 30 includes backup software 34 and also includes a current instance of the Registry, represented by Registry files 36. The computer system 30 may include various computer system hardware (e.g. such as the embodiment of FIG. 7). The backup media 32 may include a backup image 38 corresponding to the computer system 30, which may include a backup instance of the Registry represented by Registry files 40.

The backup software 34 may be configured to perform backup/restore operations for the computer system 30 to/from the backup media 32. More particularly, during restore operations, the backup software 34 may implement the HardwareKeys as described above for the backup software 14. Additionally, the backup software 34 may populate the Registry of the computer system 30 (e.g. when the backup software 34 is installed on the computer system 30). In some embodiments, the backup software 34 may be similar to the VERITAS Backup Exec™ available from VERITAS Software Corporation. Alternatively, the backup software 34 may be similar to any other backup product from any other vendor.

The backup media 32 may comprise one or more of any type of computer accessible medium, either inserted into the computer system 30 for backup/restore operations or coupled to the computer system 30. For example, the backup media 32 may comprise one or more compact disc-recordable (CD-R) media, one or more CD-rewriteable (CD-RW) media, one or more digital versatile disk-recordable (DVD-R) media, one or more DVD-rewriteable (DVD-RW) media, one or more tape media, one or more removable disk media (e.g. floppy disk, Zip disk, etc.), one or more non-volatile memory media (e.g. so-called Universal Serial Bus (USB) drives that comprise Flash memory), etc. In some embodiments, the backup media 32 may further comprise a peripheral device (e.g. an external disk drive into which various media may be inserted for backup, or an external disk drive with permanently attached media). In some embodiments, the backup media 32 may be removable from the computer system 30 so that the backup image 38 may be stored physically distant from the computer system 30.

It is noted that, while the client 12 in FIG. 1 and the computer system 30 in FIG. 2 are illustrated as having Registry files 20 and 36, respectively, the operating system on the client 12 and/or the computer system 30 may copy various Registry information into main memory, during use, for more rapid access in some embodiments.

Figure 3:
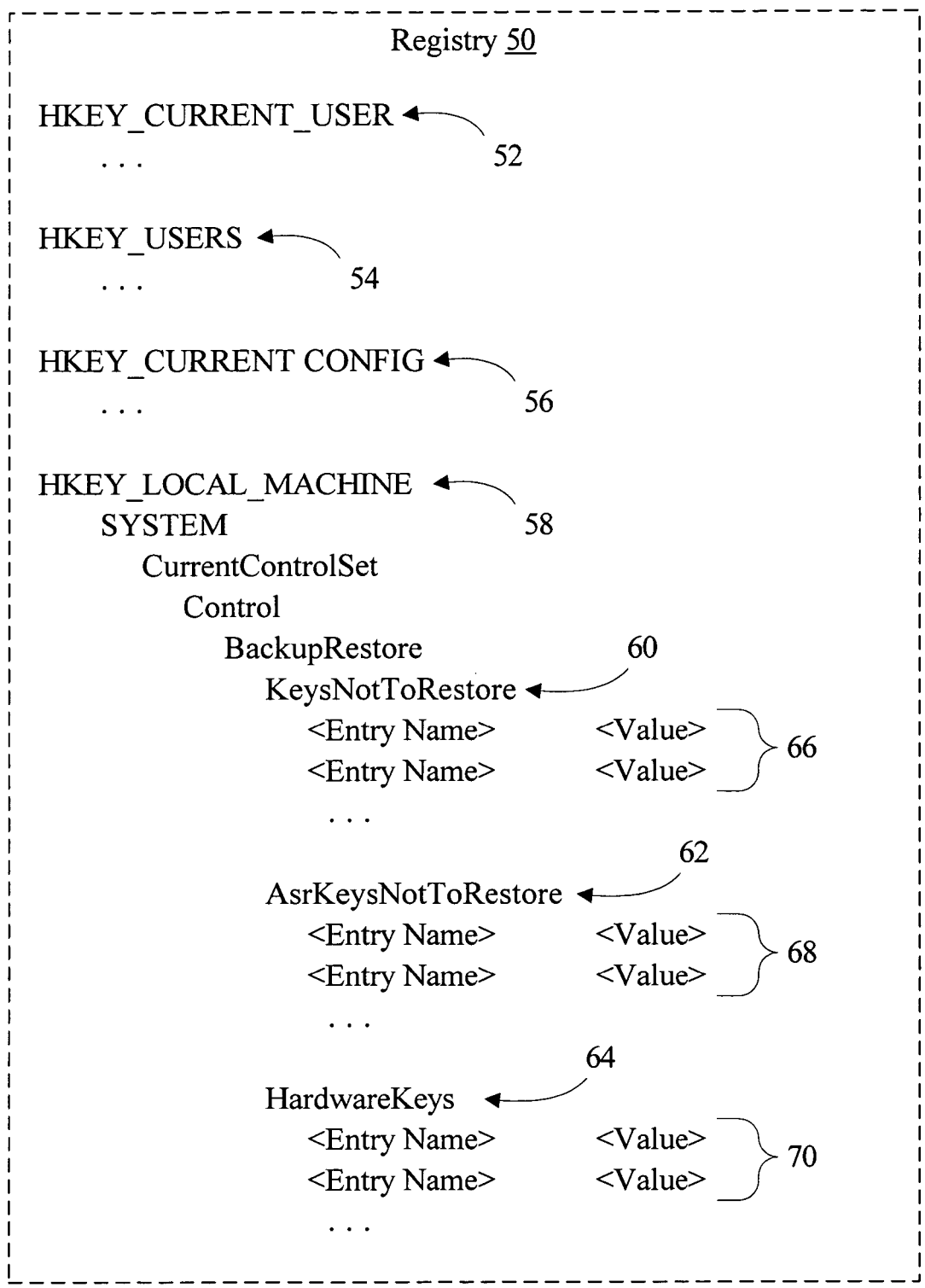
FIG. 3 is a block diagram illustrating a structure of one embodiment of a Registry.

Turning next to FIG. 3, a block diagram illustrating a structure of one embodiment of a Registry 50 including the HardwareKeys as described herein is shown. The Registry 50 on a computer system may generally include information identifying: software installed on the computer system, various settings of the software, hardware included in the computer system, various hardware settings, links between hardware and software (e.g. mappings of device drivers to hardware devices), users, etc. FIG. 3 depicts the logical structure of the Registry 50. As mentioned above, the Registry 50 may be stored as one or more Registry files (e.g. reference numerals 18 or 20 in FIG. 1, reference numerals 36 or 40 in FIG. 2). Additionally, in use, portions of the Registry 50 may be loaded into memory (e.g. operating system data structures) for more rapid access. Thus, FIG. 3 does not attempt to illustrate the physical storage of the Registry 50.

The Registry 50 as shown in FIG. 3 includes several top-level keys, which may include various entries and/or subkeys in a hierarchical structure. For example, reference numeral 52 indicates a top level key HKEY_CURRENT_USER which specifies the root of the configuration information for the user that is currently logged on to the computer systems. In some embodiments, HKEY_CURRENT_USER may be a subkey of HKEY_USERS (reference numeral 54). HKEY_USERS may identify, in its structure, the profiles for all users defined in the computer system. Reference numeral 56 indicates the HKEY_CURRENT_CONFIG, which may be a key that specifies the hardware profile used by the computer system at system startup. Each of the above keys may have various subkeys and entries for the information contained within the key (not shown explicitly in FIG. 3, but indicated by ellipses).

Reference numeral 58 indicates the HKEY_LOCAL_MACHINE key. This key specifies computer system configuration that applies to the computer system independent of which user is logged on to the computer system. In this embodiment, the KeysNotToRestore (reference numeral 60), AsrKeysNotToRestore (reference numeral 62), and HardwareKeys (reference numeral 64) are subkeys in the HKEY_LOCAL_MACHINE hierarchy. Hierarchy is illustrated in FIG. 3 by indentation. Specifically, in the illustrated embodiment, the HKEY_LOCAL_MACHINE key has a SYSTEM subkey. The SYSTEM subkey has a CurrentControlSet subkey, which has a Control subkey. The Control subkey has a BackupRestore subkey, which has the KeysNotToRestore, AsrKeysNotToRestore, and HardwareKeys keys as subkeys. Each of the above subkeys may have various other subkeys and/or entries, as desired (not shown in FIG. 3).

Each of the KeysNotToRestore 60, AsrKeysNotToRestore 62, and HardwareKeys 64 may include one or more entries (indicated by braces 66, 68, and 70 respectively in FIG. 3). The entries define the keys that are included in each of the above keys, respectively. An entry may have an entry name (<entry name> in FIG. 3) and a value (<value> in FIG. 3). For KeysNotToRestore 60, AsrKeysNotToRestore 62, and HardwareKeys 64, the <value> may be zero or more keys that are associated with the <entry name> and are included in the corresponding key. The use of the "<" and ">" in FIG. 3 is intended to indicate that "entry name" and "value" are generic identifiers, rather than specific names included in the hierarchy. Any specific entry names and values may be used.

As used herein, a "key" may be any identifier that may be used to access information in a database (e.g. the Registry). A given key may have subkeys (keys which are below the given key in the hierarchy and define additional structure of the information within the key) and/or entries. An entry may comprise information that is contained within the key. Each entry may have an entry name and a value. The entry name may be any name used to identify the corresponding value. The value may be any information that is included in the entry. For example, the value may be a file name or list of file names, a numerical value, etc. In the case of KeysNotToRestore, AsrKeysNotToRestore, and HardwareKeys, the value may be zero or more keys that are identified by the entry name, as mentioned above. Keys may be specified by their hierarchical key name, similar to a directory path (e.g. HardwareKeys may have the key path HKEY_LOCAL_MACHINE\SYSTEM\CurrentControlSet\Control\BackupRestore\HardwareKeys in the embodiment of FIG. 3). The hierarchical key name is also referred to as a key path. Thus, the value of the entries in KeysNotToRestore, AsrKeysNotToRestore, and HardwareKeys may zero or more key paths.

In some embodiments, the values in the entries of KeysNotToRestore, AsrKeysNotToRestore, and HardwareKeys may specify keys (and subkeys and entries) in a variety of ways. For example, a key path ending in "\" may indicate that the identified key and all of its subkeys and entries, if any, are preserved from the current instance. Even if the backup instance includes subkeys or entries of the key path that are not included in the current instance, such subkeys or entries are not restored from the backup instance. A key path ending in "\*" may indicate that the identified key and all of its subkeys and entries, if any, are preserved from the current instance. However, if the backup instance includes subkeys or entries of the key path that are not included in the current instance, such subkeys or entries are restored from the backup instance. A key path ending in an entry name indicates that the entry is to be preserved from the current instance.

For the illustrated embodiments, a conflict between KeysNotToRestore, AsrKeysNotToRestore, and HardwareKeys may be detected on an entry-by-entry basis. That is, if two or more of the above keys include an entry having the same name, then a conflict occurs. HardwareKeys takes precedence over AsrKeysNotToRestore, which takes precedence over KeysNotToRestore in the present embodiment. That is, in a conflict situation, the entry in HardwareKeys is used instead of the conflicting entry in either of the other two keys. Similarly, in a conflict situation, the entry in AsrKeysNotToRestore is used instead of the conflicting entry in KeysNotToRestore. Viewed in another way, the entry in the HardwareKeys overrides the preservation of at least one key specified in the conflicting entry in either of the other two keys, Similarly, in a conflict situation, the entry in AsrKeysNotToRestore overrides the conflicting entry in KeysNotToRestore.

Figure 4:
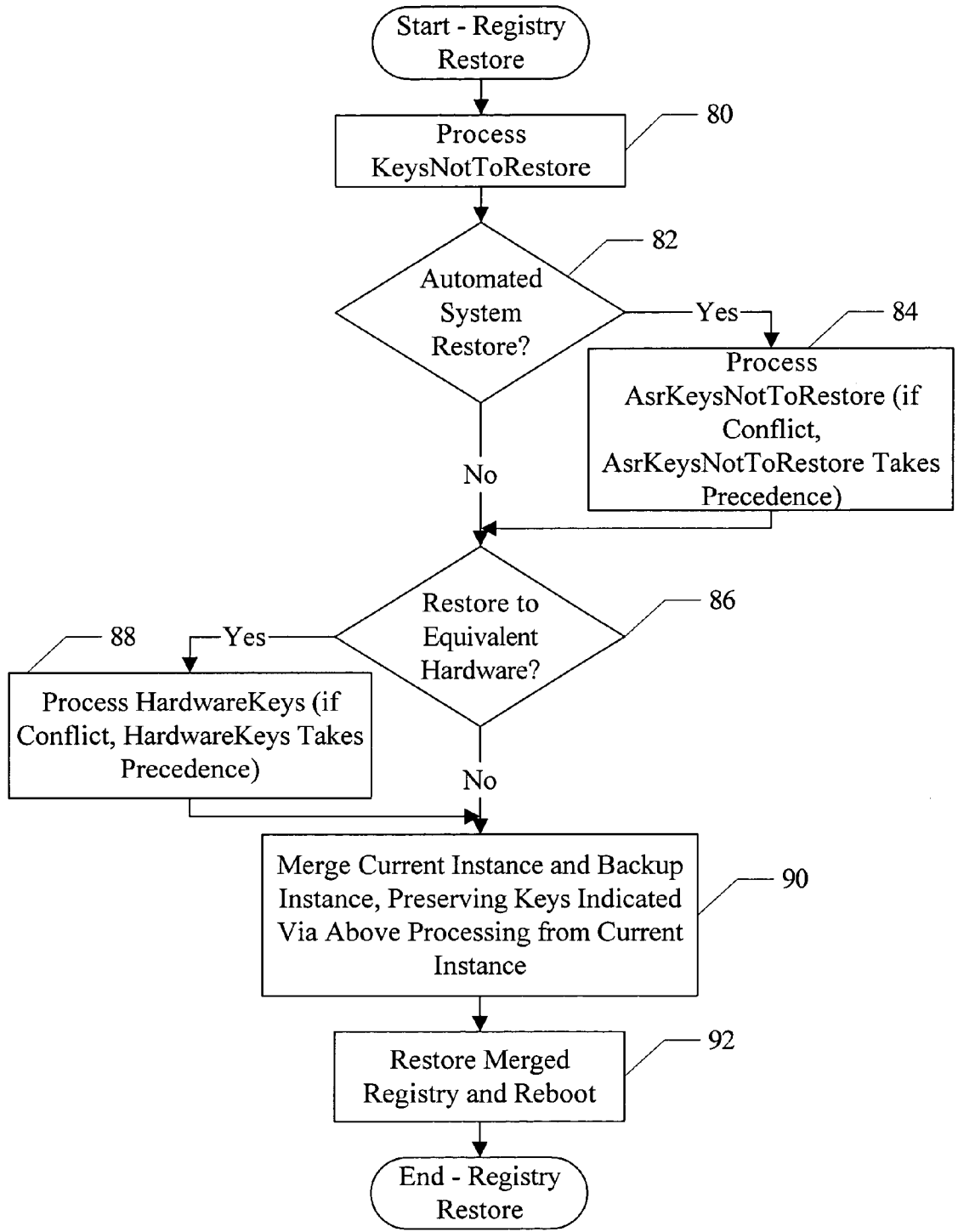
FIG. 4 is a flowchart illustrating one embodiment of restoring the Registry.

Turning now to FIG. 4, a flowchart is shown illustrating a Registry restore operation. The Registry restore operation may be part of any restore operation (e.g. a regular restore operation or an automated system restore operation). That is, the backup software 14 or 34 may include instructions which, when executed, implement the operation of FIG. 4.

The software may unconditionally process the KeysNotToRestore key in the current instance (block 80). That is, if a Registry restore operation is to occur, the KeysNotToRestore key is processed. By contrast, the AsrKeysNotToRestore and the HardwareKeys may be processed conditionally, as set forth below. As used herein, to "process" a key refers to obtaining its contents from the instance and making note of its contents for restoring the Registry. For example, a list of the keys that are to be preserved from the current instance may be made. Processing the KeysNotToRestore key may include creating the list. Processing the other keys may include updating the list and resolving conflicts between the list and the contents of the other keys. Any representation of the key's contents may be used.

If the Registry restore operation is part of an automated system restore operation (decision block 82, "yes" leg), the software processes the AsrKeysNotToRestore key (block 84). If there are any conflicts between the AsrKeysNotToRestore key and the KeysNotToRestore key, the AsrKeysNotToRestore key takes precedence. In this embodiment, conflicts are detected if a matching entry name is included in both keys. Thus, if a conflict is detected, keys from the conflicting entry of the KeysNotToRestore are ignored and the keys from the conflicting entry of the AsrKeysNotToRestore are used. If the Registry restore operation is not part of an automated system restore operation (decision block 82, "no" leg) the AsrKeysNotToRestore key is not processed. That is, processing of the AsrKeysNotToRestore is conditional on an automated system restore operation being in progress.

If the restore operation is performed to equivalent hardware (decision block 86, "yes" leg), the software processes the HardwareKeys key (block 88). Again, if there are any conflicts between the HardwareKeys key and either or both of the KeysNotToRestore key or the AsrKeysNotToRestore key, the HardwareKeys key takes precedence. In some embodiments, the HardwareKeys may specify entry names and keys to be preserved, similar to the KeysNotToRestore and AsrKeysNotToRestore keys (and override settings in these two keys but not including the keys to be restored in the HardwareKeys entries). In such embodiments, processing the HardwareKeys may be similar to processing the AsrKeysNotToRestore. In other embodiments, the HardwareKeys key may specify the keys to be restore directly. In such embodiments, each key in the HardwareKeys entries may be compared to the list of keys not to restore, and may be deleted from the list if located. If the restore operation is not performed to equivalent hardware (decision block 86, "no" leg) the HardwareKeys key is not processed. That is, processing of the HardwareKeys is conditional on the restore operation being performed to equivalent hardware.

The software may merge the current instance and the backup instance (effectively creating a merged instance, although in some cases the merged instance may overwrite one of the other two instances) (block 90). The merging includes preserving keys indicated via the processing of the KeysNotToRestore, AsrKeysNotToRestore, and HardwareKeys from the current instance but otherwise restoring keys from the backup instance (including keys specified in the KeysNotToRestore and/or AsrKeysNotToRestore that are overridden by the HardwareKeys). The software may restore the merged Registry instance to the computer system (block 92). In the present embodiment, completion of the restore may including rebooting the computer system. The computer system may activate the merged, restored Registry in response to rebooting.

Figure 5:
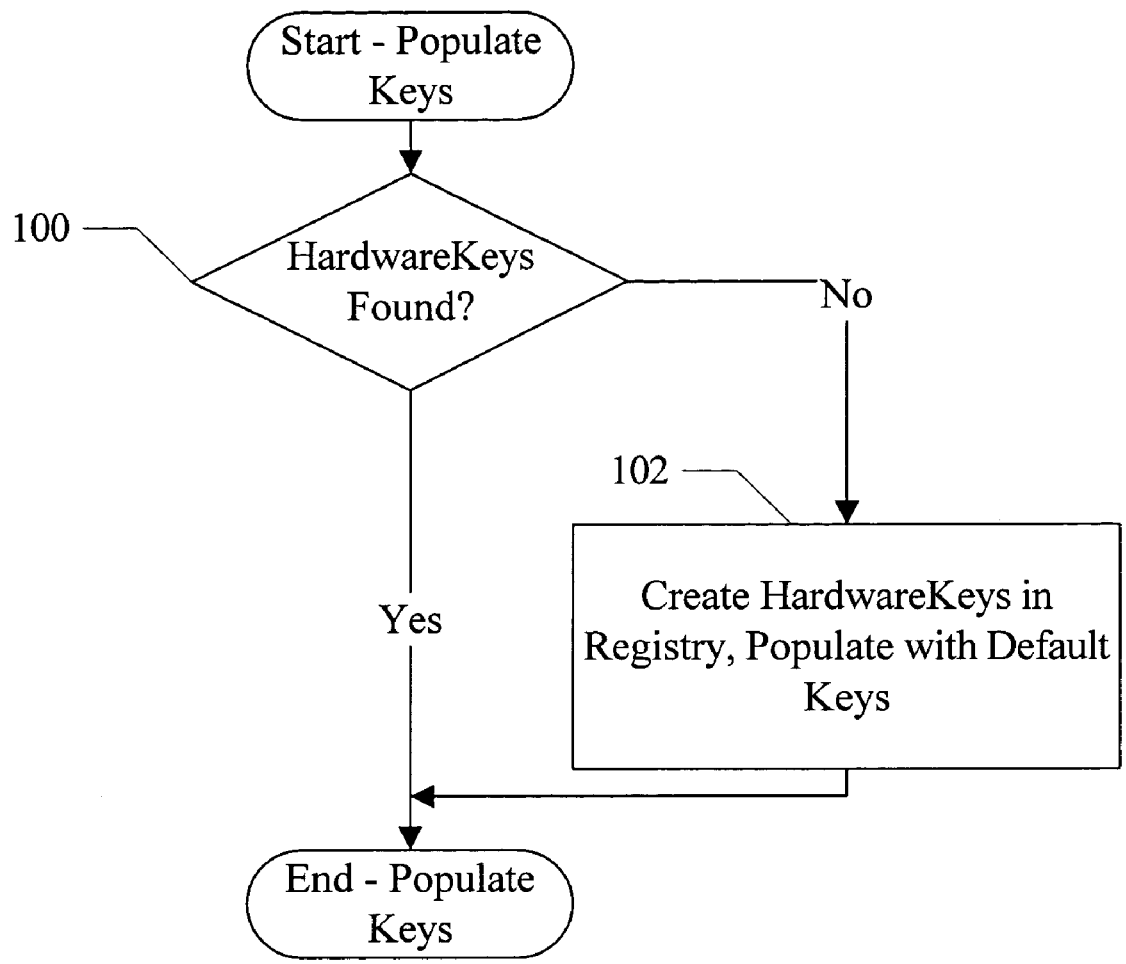
FIG. 5 is a flowchart illustrating one embodiment of populating the Registry.

Turning now to FIG. 5, a flowchart is shown illustrating populating the HardwareKeys into the Registry. For example, software implementing the flowchart of FIG. 5 may be executed when backup software is installed on a computer system, or when a client is added to the systems backed up by a backup server. Populating the HardwareKeys may be part of the backup software 14 or 34, in some embodiments. That is, the backup software 14 or 34 may include instructions which, when executed, implement the operation of FIG. 5.

The software may check the Registry 50 to determine if the HardwareKeys key is already in the Registry 50 (decision block 100). If the Registry 50 already includes the HardwareKeys (decision block 100, "yes" leg), the software may not update the Registry 50. The HardwareKeys in the Registry 50 may have been modified and populating the HardwareKeys with default keys may override previous modifications. In other embodiments, the software may include default keys not found in the Registry 50.

If the Registry 50 does not include the HardwareKeys (decision block 100, "no" leg), the software may create the HardwareKeys in the registry and may populate the HardwareKeys with a default set of keys (block 102). The default set of keys may be keys that solve previously-noted losses of hardware-specific information during restore operations to equivalent hardware. For example, a backup software vendor may have determined the default keys based on customer calls to a technical support line, and the diagnosing of customer problems that ensue from the calls.

It is noted that the HardwareKeys may also be changed at other times. For example, an administrator or user may modify the HardwareKeys based on their own experience with restoring computer systems set up in the fashion they choose. Additionally, as the keys included in the Registry 50 change, the HardwareKeys may also be changed.

Figure 6:
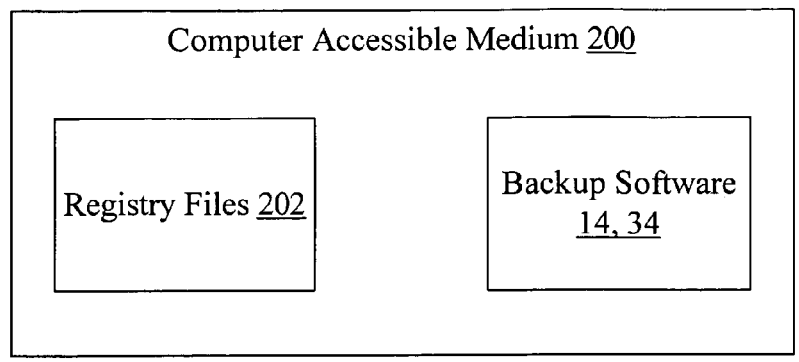
FIG. 6 is a block diagram of one embodiment of a computer accessible medium.

Turning now to FIG. 6, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, conveyed via a communication medium such as a network and/or a wireless link. The computer accessible medium 200 in FIG. 6 may be encoded with one or more of the backup software 14 and/or 34. Additionally, the computer accessible medium 200 may be encoded with one or more Registry files 202, which may comprise an instance of the Registry 50 including the HardwareKeys. The backup software 14 and/or 34 may comprise instructions which, when executed, implement the operation described herein for the software. Generally, the computer accessible medium 200 may store any set of instructions which, when executed, implement a portion or all of the flowcharts shown in one or more of FIGS. 4 and 5. In some embodiments, a computer accessible medium similar to the computer accessible medium 200 may be included in the computer system 30, the client 12, and/or the backup server 10.

FIG. 7 is a block diagram of one embodiment of an exemplary computer system 210. In the embodiment of FIG. 7, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A computer accessible storage medium storing a plurality of instructions which, when executed during a restore operation of a database to a computer system, wherein the database describes a computer system configuration, and wherein a first instance of the database is included in backup data being restored and a second instance of the database exists on the computer system:

process one or more first keys of the second instance, the one or more first keys identifying one or more second keys of the second instance, wherein identification by the one or more first keys indicates that the one or more second keys are to be preserved in the database subsequent to the restore operation;

if the computer system's hardware is equivalent to hardware of a source of the backup data, process a third key, wherein the third key overrides a preservation of at least one of the one or more second keys from the second instance, and wherein at least one other one of the one or more second keys remains preserved from the second instance subsequent to processing the third key, wherein each key of a given instance of the database is an identifier used to access information in the given instance; and merge the first instance and the second instance of the database to generate a third instance, wherein the third instance comprises: (i) each of the one or more second keys from the second instance whose preservation is not overridden by the third key; and (ii) each of the one or more second keys from the first instance whose preservation is overridden by the third key; wherein the third instance comprises at least one second key from the first instance and a least one second key from the second instance.

2. The computer accessible storage medium as recited in claim 1 wherein the plurality of instructions, when executed, restore the third instance to the computer system.

3. The computer accessible storage medium as recited in claim 1 wherein the source comprises a second computer system.

4. The computer accessible storage medium as recited in claim 1 wherein the source comprises the computer system, via a backup operation performed prior to the restore operation.

5. The computer accessible storage medium as recited in claim 1 wherein the one or more first keys comprise a fourth key and a fifth key, wherein the fifth key is processed if the restore operation is an automated system restore operation.

6. The computer accessible storage medium as recited in claim 5 wherein the fourth key is unconditionally processed during the restore operation.

7. The computer accessible storage medium as recited in claim 1 further storing a second plurality of instructions which, when executed prior to a backup operation on the source, insert the third key into the database if the third key is not found in the database.

8. The computer accessible storage medium as recited in claim 7 wherein the second plurality of instructions are executed responsive to an install of the second plurality of instructions and the plurality of instructions on the source.

9. A computer system comprising a processor and the computer accessible storage medium as recited in claim 1, the processor coupled to the computer accessible storage medium and configured to execute the plurality of instructions.

10. A method, during a restore operation of a database to a computer system, wherein the database describes a computer system configuration, and wherein a first instance of the database is included in backup data being restored and a second instance of the database exists on the computer system, the method comprising:

processing one or more first keys of the second instance, the one or more first keys identifying one or more second keys of the second instance, wherein identification by the one or more first keys indicates that the one or more second keys are to be preserved in the database subsequent to the restore;

determining that the computer system's hardware is equivalent to hardware of a source of the backup data;

responsive to the determining, processing a third key, wherein the third key overrides a preservation of at least one of the one or more second keys from the second instance, and wherein at least one other one of the one or more second keys remains preserved from the second instance subsequent to processing the third key, wherein each key of a given instance of the database is an identifier used to access information in the given instance; and merging the first instance and the second instance of the database to generate a third instance, wherein the third instance comprises: (i) each of the one or more second keys from the second instance whose preservation is not overridden by the third key; and (ii) each of the one or more second keys from the first instance whose preservation is overridden by the third key; wherein the third instance comprises at least one second key from the first instance and a least one second key from the second instance.

11. The method as recited in claim 10 further comprising restoring the third instance to the computer system.

12. The method as recited in claim 10 wherein the source comprises a second computer system.

13. The method as recited in claim 10 wherein the source comprises the computer system, via a backup operation performed prior to the restore operation.

14. The method as recited in claim 10 wherein the one or more first keys comprise a fourth key and a fifth key, wherein processing the one or more first keys comprises processing the fifth key if the restore operation is an automated system restore operation.

15. The method as recited in claim 14 wherein processing the one or more first keys further comprises unconditionally processing the fourth key.

16. The method as recited in claim 10 further comprising, prior to a backup operation on the source, inserting the third key into the database if the third key is not found in the database.

17. A computer accessible storage medium storing a plurality of instructions which, when executed during a restore operation of a database to a computer system, wherein the database describes a computer system configuration, and wherein a first instance of the database is included in backup data being restored and a second instance of the database exists on the computer system:
   process one or more first keys of the second instance, the one or more first keys identifying one or more second keys of the second instance, wherein identification by the one or more first keys indicates that the one or more second keys are to be preserved in the database subsequent to the restore; and
   if the computer system's hardware is equivalent to hardware of a source of the backup data, process a third key, wherein the third key takes precedence over the one or more first keys if a conflict exists between the one or more first keys and the third key, and wherein each second key for which the conflict exists is restored from the first instance instead of preserved from the second instance and each second key for which no conflict exists is restored from the second instance, wherein each key of a given instance of the database is an identifier used to access information in the given instance.

18. The computer accessible storage medium as recited in claim 17 wherein the plurality of instructions, when executed, merge the first instance and the second instance of the database to generate a third instance under control of the one or more first keys and, if the computer system's hardware is equivalent to hardware of a source of the backup data, the third key.

19. The computer accessible storage medium as recited in claim 17 wherein the plurality of instructions, when executed, restore the third instance to the computer system.

20. The computer accessible storage medium as recited in claim 17 wherein the one or more first keys comprise a fourth key and a fifth key, wherein the fifth key is processed if the restore operation is an automated system restore operation, and wherein the fifth key takes precedence over the fourth key if there is conflict between the fifth key and the fourth key.

21. The computer accessible storage medium as recited in claim 20 wherein the fourth key is unconditionally processed during the restore operation.

22. A computer system comprising a processor and the computer accessible storage medium as recited in claim 17, the processor coupled to the computer accessible storage medium and configured to execute the plurality of instructions.

* * * * *